United States Patent [19]

Atwater

[11] E Re. 29,108

[45] Reissued Jan. 11, 1977

[54] DRILL-OPERATED ABRADING TOOL

[75] Inventor: William M. Atwater, Pittsboro, N.C.

[73] Assignee: Harriss-Conners Chevrolet, Inc., Chapel Hill, N.C.

[22] Filed: Dec. 9, 1975

[21] Appl. No.: 639,207

Related U.S. Patent Documents

Reissue of:

[64] Patent No.: 3,869,832
Issued: Mar. 11, 1970
Appl. No.: 474,131
Filed: May 28, 1974

[52] U.S. Cl. ..... 51/170 PT; 51/372
[51] Int. Cl.[2] ..... B24B 23/02
[58] Field of Search ..... 51/170 PT, 241 R, 372, 51/380, 392, 393, 389; 29/110, 117, 120

[56] References Cited

UNITED STATES PATENTS

| | | | |
|---|---|---|---|
| 819,578 | 5/1906 | McCoy | 51/372 |
| 1,570,166 | 1/1926 | Morris | 51/372 X |
| 2,554,763 | 5/1951 | Wickman | 51/170 PT |
| 3,381,418 | 5/1968 | Eisbrenner | 51/170 PT |
| 3,510,989 | 5/1970 | Tolle | 51/170 PT |
| 3,649,036 | 3/1972 | Harz | 51/372 X |
| 3,656,920 | 4/1972 | Helms | 51/170 PT |

*Primary Examiner*—Al Lawrence Smith
*Assistant Examiner*—James G. Smith
*Attorney, Agent, or Firm*—B. B. Olive

[57] ABSTRACT

A portable abrading tool useful in automobile body work, and the like, embodies a hollow expandable cylinder which is adapted to receive an expandable and disposable cylindrical abrading sleeve and be driven by and secured to an electric hand drill. A unique structure for expanding and contracting the driven cylinder facilitates quick replacement of the abrading sleeve.

2 Claims, 12 Drawing Figures

FIG. 2
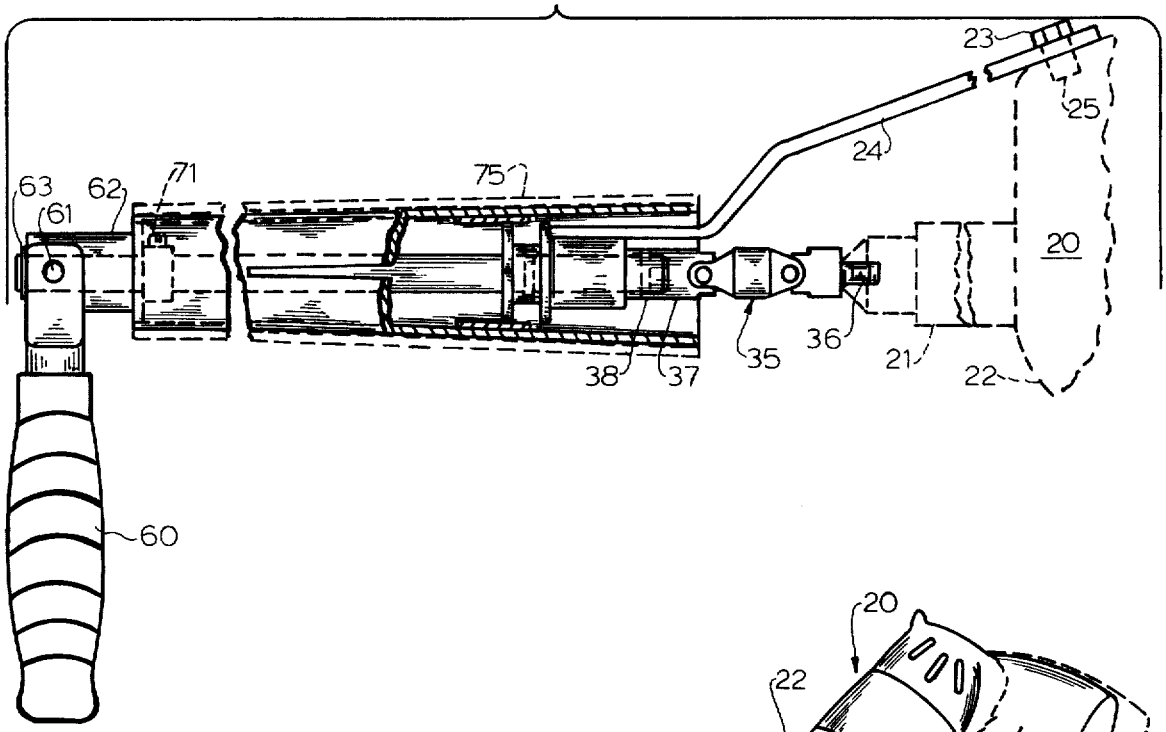
FIG. 12
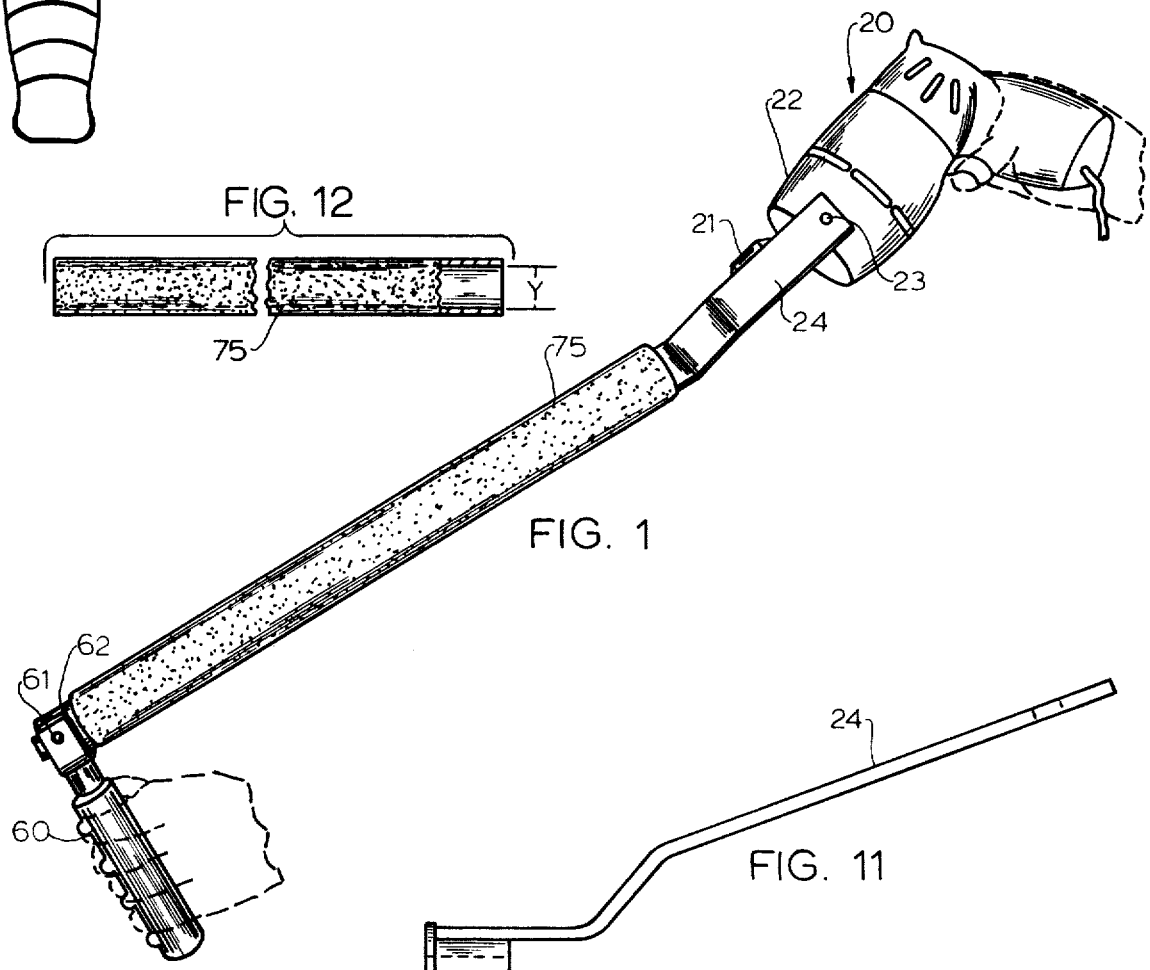
FIG. 1
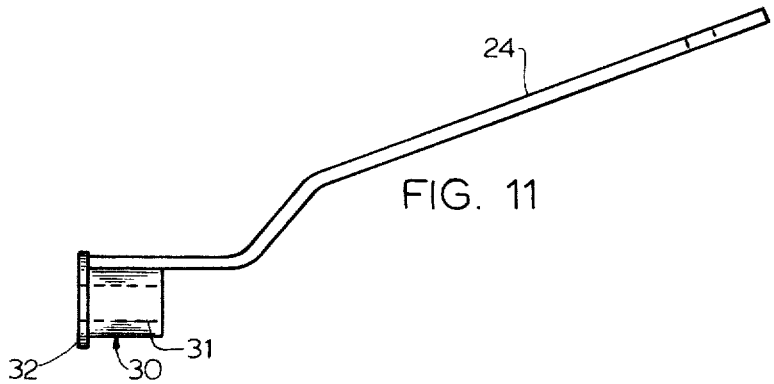
FIG. 11

FIG. 3
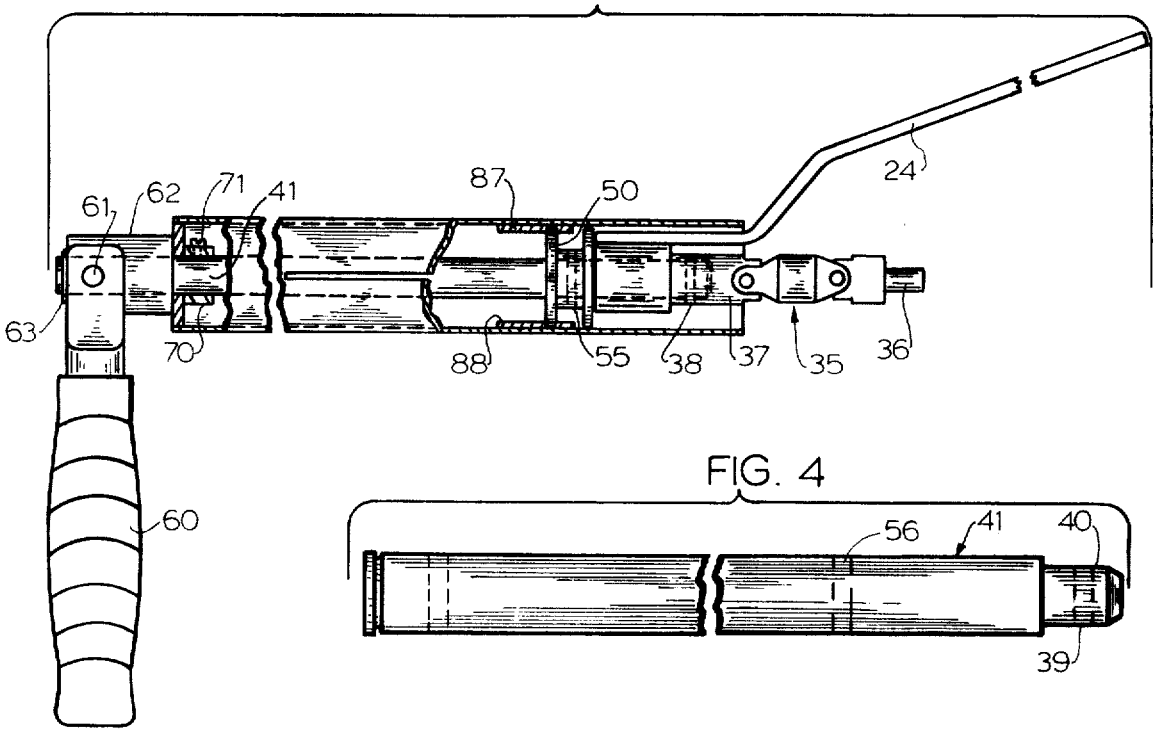
FIG. 4
FIG. 5
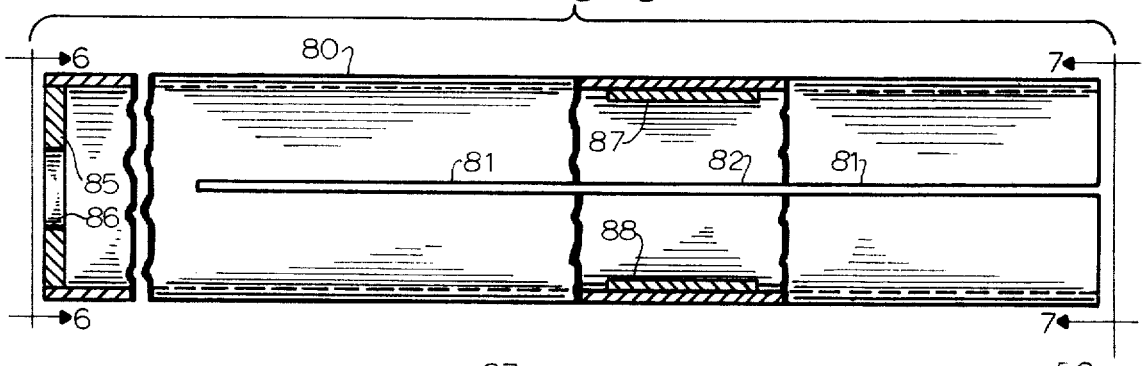
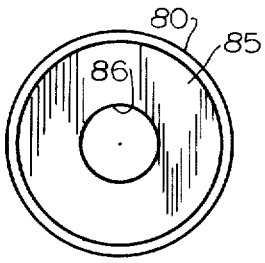
FIG. 6
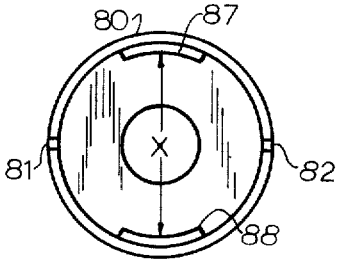
FIG. 7
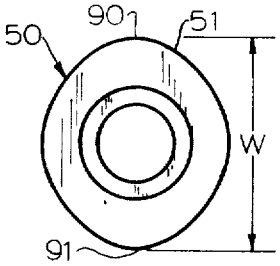
FIG. 8
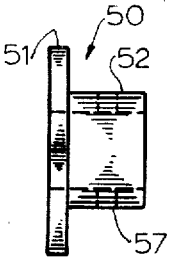
FIG. 9
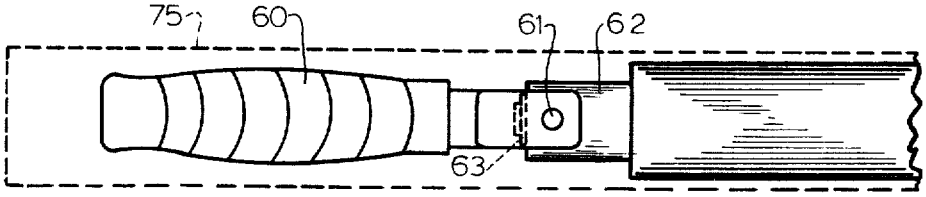
FIG. 10

DRILL-OPERATED ABRADING TOOL

Matter enclosed in heavy brackets [ ] appears in the original patent but forms no part of this reissue specification; matter printed in italics indicates the additions made by reissue.

BACKGROUND OF THE INVENTION

1. Field of the Invention:

The invention relates broadly to abrading tools and more specifically to electrically powered abrading tools used in automobile body repair work, and the like.

2. Description of the Prior Art:

A variety of electrically powered abrading tools are known to the trade. It is also known to provide a portable abrading tool driven by a hand electric drill. More specifically, the art has provided an electric hand drill driven split cylinder adapted to be expanded to receive and tightly grip a cylindrical abrasive sleeve. Representative prior art is found in U.S. Pat. Nos. 819,578, 2,554,763 and 3,381,418, all of which are concerned with portable abrading tools powered with an electric drill. Other U.S. patents related to this general subject matter include U.S. Pat. Nos. 2,853,838, 3,510,989 and 3,596,411.

In spite of the very substantial interest among body shop operators to have an abrading tool which can be quickly connected to and used with an ordinary electric hand drill without impairing the normal purposes of the hand drill, such an apparatus has not come into widespread use in the trade. More expensive types of abrading tools in which the motor unit and abrading unit are designed as a unified electrical apparatus are available but such devices generally have no utility except for abrading. One of the primary deficiencies in the prior art is believed to be the fact that abrading tools designed to be driven by an electric hand drill have not provided a practical means for expanding and contracting the driven cylinder over which the abrading sleeve is placed. Therefore, prior art abrading tools driven by electric hand drills have not come into popular use even though there is a strong demand for such a tool.

SUMMARY OF THE INVENTION

The apparatus of the invention is directed to an abrading tool primarily intended for use in body shop repair work. The abrading tool constitutes a driven cylinder which is connected through a universal joint arrangement to the chuck of an electric hand drill and a bracket extends between the tool and a bearing support such that the tool of the invention can be both driven and supported by an electric hand drill. Further, the tool can be quickly removed from the electric drill when the electric drill is needed for its normal drilling purposes.

The drill chuck is connected through the mentioned universal joint to a driven shaft which mounts an elliptical cam. The shaft extends from its driven end through and slightly beyond an opposite end of a split, i.e., longitudinally slotted, cylinder. The split cylinder is adapted to receive a cylindrical abrading sleeve which can be tightened and loosened on the driven cylinder by expanding and contracting the split sleeve portion of the driven cylinder. The tool also mounts at the end opposite the drill driven end a pivoted handle such that the tool in use can be held at one end by this handle and at the opposite end by the electric drill handle. In operation, the elliptical cam is rotated to a position which allows the driven cylinder to contract and an abrading sleeve to be placed over the driven cylinder. When the electric drill is energized, the cam is brought in contact with bearing surfaces within the driven cylinder which causes the cylinder to expand, causes the abrading sleeve to be tightened on the driven cylinder and allows the driven cylinder and its mounted abrading sleeve to be driven by the electric drill for abrading. When this abrading sleeve has become worn, the operator rotates the cam relative to the driven cylinder and brings the cam into a position which allows the driven cylinder to contract and the worn abrading sleeve to be removed for purposes of replacement.

DESCRIPTION OF THE DRAWINGS

FIG. 1 is a perspective view of an abrading tool according to the invention as it appears ready for use.

FIG. 2 is a cross section view through the tool with the electric hand drill being shown in dashed lines and the expanded position of the abrading sleeve exaggerated and also shown in dashed lines.

FIG. 3 is a partially cutaway sectional view showing the bearing and cam details of the invention apparatus.

FIG. 4 is a side view of the drive shaft employed in the invention apparatus.

FIG. 5 is a sectional view of the split cylinder employed to support the abrading sleeve.

FIG. 6 is an end view taken in the direction 6–6 of FIG. 5.

FIG. 7 is an end view taken in the direction 7–7 of FIG. 5.

FIG. 8 is an end view of the cam employed to expand the driven sleeve.

FIG. 9 is a side view of the cam.

FIG. 10 is a somewhat schematic view showing the auxiliary handle positioned for removing a used abrading sleeve which is indicated in dashed lines.

FIG. 11 is a side view of the bearing bracket assembly used to support the tool from the drill.

FIG. 12 is a partial cross section taken through an abrading sleeve of the type employed with the invention apparatus.

DESCRIPTION OF THE PREFERRED EMBODIMENT

The abrading tool to be described is designed to be operated by a conventional hand drill 20 having a conventional chuck 21 and a front housing 22 having a threaded aperture 25 adapted to receive a bolt 23 for securing a bent bracket 24. While many electric drills will provide the front housing threaded aperture 25 suited to act as a point of attachment for the tool of the invention, such an aperture, i.e., aperture 25, can be readily formed on the front housing if not already part of the drill as originally manufactured. Bracket 24 may be formed of a bent metal strip and is integrally secured to a bearing 30 having a hub portion 31 and a flange portion 32.

A universal joint 35 has a spindle portion 36 which is received by the chuck 21 and at the opposite end has a socket portion 37 which is secured by a pin 38 which passes through a hole 39 which is provided in a reduced end portion 40 of driven shaft 41. Shaft 41 is rotatably received in the previously mentioned support bearing 30 and resides between socket 37 and a cam 50. Cam 50 has a somewhat elliptical camming disc portion 51 and a hub portion 52 which receives shaft 41 and is pinned to shaft 41 by a pin 55 which extends through a hole 56 provided in shaft 41 and holes 57 in hub 52 of cam 50.

On the opposite end of shaft 41 there is mounted an auxiliary handle 60 having a pivotal pin connection 61 to a bearing 62 which receives the extreme end portion of shaft 41. A suitable locking ring 63 retains bearing 62 on shaft 41. Shaft 41 is further held in position by a sleeve 70 which is secured to shaft 41 by a set screw 71. The abrading sleeve 75 mounts on a split thin walled, metal cylindrical sleeve 80 having a pair of longitudinal slots or slits 81, 82 extending from its driven end over a major portion of its length. While two slots are preferred, one slot can be used. The width and length of slots 81, 82 and the wall thickness and metal used for sleeve 80 are chosen to given sleeve 80 the necessary contraction and expansion capability as will be readily understood. Cylinder 80 is closed at its outermost end by a thin walled washer 85 having an aperature 86 through which passes shaft 41. Washer 85 is secured to cylinder 80 and resides between bearing 62 and sleeve 70. Within cylinder 80 there are mounted two oppositely disposed curved bearing plates 87, 88. Sleeve 80 is expanded by rotating the cam 50 until the camming surfaces indicated at 90, 91 come into full contact or approximately full contact with the bearing plates 87, 88. That is, the dimension W in FIG. 8 is designed such that when dimension X in FIG. 7 equals dimension W in FIG. 8, the cylinder 80 will be fully expanded and will firmly grip the abrading sleeve 75. It should also be noted that dimension Y, that is, the internal diameter of abrading sleeve 75, is selected such that when dimension X is increased to dimension W the abrading sleeve 75 will be sufficiently tightened on cylinder 80 to hold its position. Since abrading sleeves as such are well known, it is believed that those skilled in the art can readily select a particular type of abrading sleeve whose strength, wall thickness, and internal diameter are suited to the invention. Alternatively, when cam 50 is rotated a sufficient amount to bring surfaces 90, 91 out of contact with bearing plates 87, 88, cylinder 80 may contract which allows the used abrading sleeve 75 to be removed and replaced by pivoting auxiliary handle 60 as schematically indicated in FIG. 10.

In summary, it can be seen that there is provided a relatively inexpensive abrading tool accessory for an ordinary electric tool and which provides an ease of abrading sleeve replacement not previously found in the prior art.

I claim:

1. A portable abrading tool adapted to be removably secured to a hand electric drill of the type having a front housing, a chuck supported on the face of said housing, and a threaded aperture thereon for receiving a threaded fastener, said tool comprising, in combination:

a. a hollow elongated cylinder member having at least one slit in the wall thereof and extending for a major portion of the length thereof, having bearing surfaces within said cylinder member intermediate the length thereof and at oppositely disposed positions substantially radially removed from said slit, said bearing surfaces being adapted to receive a camming pressure for expanding said cylinder member, said cylinder member being open at one driven end and being closed at the opposite end by a wall having a central aperture;

b. a driven shaft centrally positioned within said cylinder member and extending from a driven end proximate said cylinder member open end to and through said cylinder member closed end and providing externally of said cylinder member closed end a handle mounting extension portion;

c. a bearing mounted on said driven shaft handle portion and having pivotally connected thereto an auxiliary handle and locking means secured to said drive shaft for retaining said handle bearing on said shaft;

d. a locking sleeve secured to said drive shaft internally of said cylinder member and proximate said end wall;

e. camming means secured to said drive shaft and disposed between said bearing surfaces, said camming means when rotated with respect to said bearing surfaces being operable in a first rotative position to contact said bearing surfaces and expand said cylinder member to tighten any abrading sleeve positioned thereon and in a second rotative position being movable out of contact with said bearing surfaces to allow said cylinder member to contract and said abrading sleeve to be removed;

f. a support bearing mounted internally of said cylinder member outwardly from said camming means and proximate said shaft driven end;

g. a bracket comprising a bent arm member having one end secured to said support bearing and the opposite end secured to a said drill housing by threaded fastener means mating with a said threaded fastening aperture on said housing;

h. a universal coupling means having at one end, a socket connection secured to said drive shaft driven end and at the opposite end to a spindle secured to a said drill chuck; and i. an abrading sleeve having an appropriate length and internal diameter fitted on said cylinder member and adapted to be tightened thereon by rotation of said camming means against said bearing surfaces to said first rotative position and to be loosened for replacement by rotation of said camming means to said second rotative position.

*2. A portable abrading tool adapted to be removably secured to a hand electric drill of the type having a front housing, a chuck supported on the face of said housing, said tool comprising, in combination:*

*a. a hollow elongated cylinder member having at least one slit in the wall thereof and extending for a major portion of the length thereof, having bearing surfaces within said cylinder member intermediate the length thereof and at oppositely disposed positions substantially radially removed from said slit, said bearing surfaces being adapted to receive a camming pressure for expanding said cylinder member, said cylinder member being open at one driven end and being closed at the opposite end by a wall having a central aperture;*

*b. a drive shaft centrally positioned within said cylinder member and extending from a driven end proximate said cylinder member open end to and through said cylinder member closed end and providing externally of said cylinder member closed end a handle mounting extension portion, said driven end being secured to a said drill chuck;*

*c. a bearing mounted on said drive shaft handle portion and having connected thereto an auxiliary handle and locking means secured to said drive shaft for retaining said handle bearing on said shaft;*

*d. camming means secured to said drive shaft and disposed between said bearing surfaces, said camming means when rotated with respect to said bearing surfaces being operable in a first rotative position to contact said bearing surfaces and expand said cylinder member to tighten any abrading sleeve positioned thereon and in a second rotative position being movable out of contact with said bearing surfaces to*

*allow said cylinder member to contract and said abrading sleeve to be removed;*

*e. a support bearing mounted internally of said cylinder member outwardly from said camming means and proximate said shaft driven end; and*

*f. an abrading sleeve having an appropriate length and internal diameter fitted on said cylinder member and adapted to be tightened thereon by rotation of said caming means against said bearing surfaces to said first rotative position and to be loosened for relacement by rotation of said camming means to said second rotative position.*

* * * * *

UNITED STATES PATENT OFFICE

CERTIFICATE OF CORRECTION

Patent No. Re. 29,108 Dated Reissued Jan. 11, 1977

Inventor(s) William M. Atwater

It is certified that error appears in the above-identified patent and that said Letters Patent are hereby corrected as shown below:

On the cover page, under "Related U.S. Patent Documents" the date "Mar. 11, 1970" should be --Mar. 11, 1975--.

Col. 2, line 66, "driven" should be --drive--.

Col. 3, line 18, "given" should be --give--.

Col. 4, line 3, "driven" should be --drive--.

Col. 4, line 9, "driven" should be --drive--.

Signed and Sealed this

Fifth Day of April 1977

[SEAL]

*Attest:*

RUTH C. MASON
*Attesting Officer*

C. MARSHALL DANN
*Commissioner of Patents and Trademarks*